June 5, 1962   R. S. HAMPTON ET AL   3,037,657
CONICAL SUPPORT FOR JACKETED VESSEL
Filed March 3, 1958
FIG_1
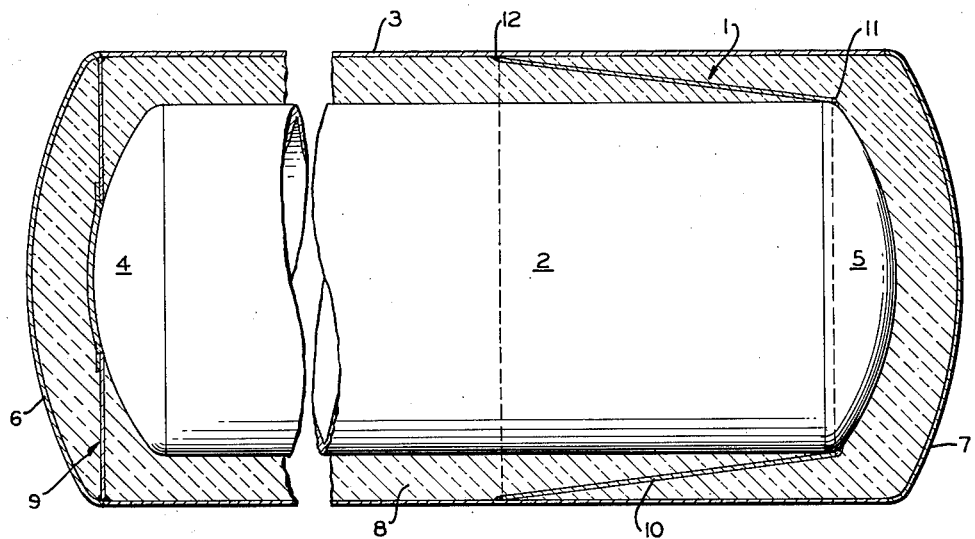
FIG_2
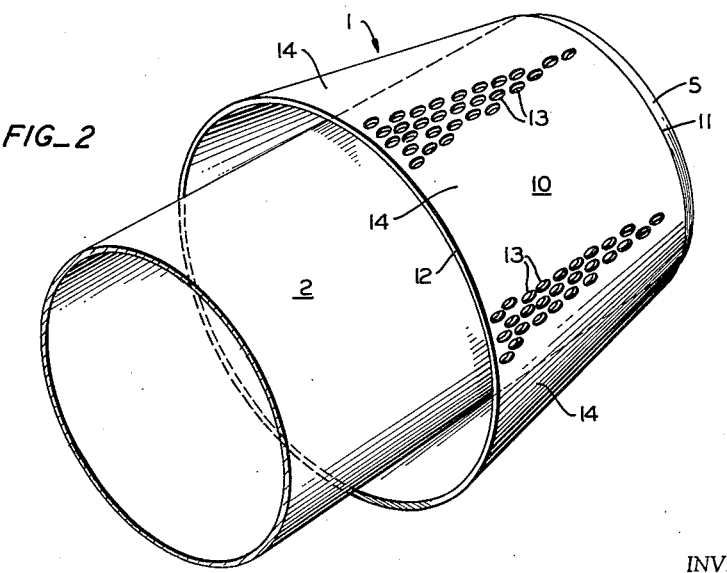
INVENTORS
ROBERT S. HAMPTON
WILLIAM JOSEPHIAN
BY
*Boyken, Mohler & Wood*
ATTORNEYS June 5, 1962 R. S. HAMPTON ET AL 3,037,657
CONICAL SUPPORT FOR JACKETED VESSEL
Filed March 3, 1958 3 Sheets-Sheet 2
FIG_3
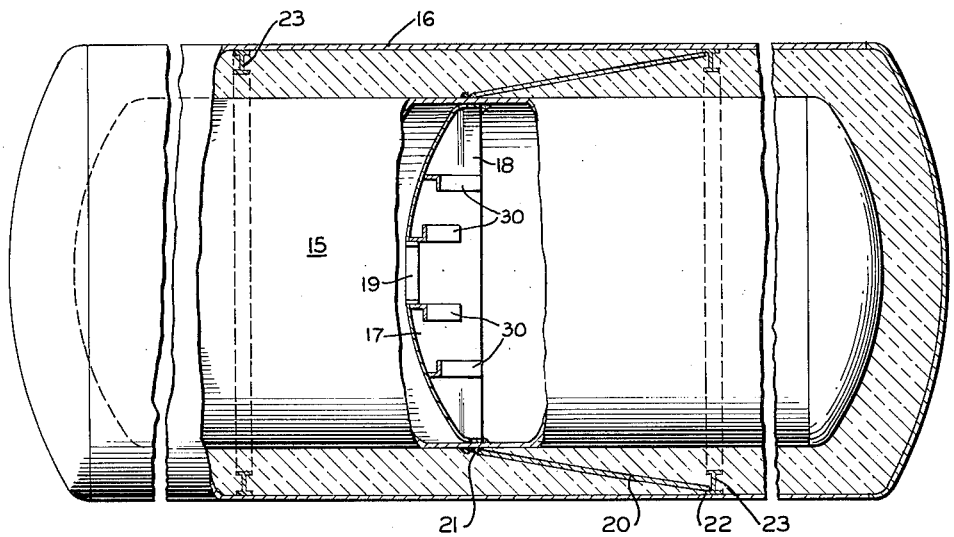
FIG_4
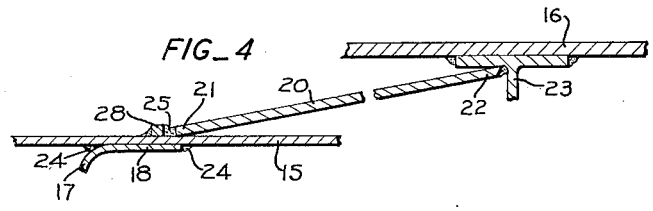
FIG_5
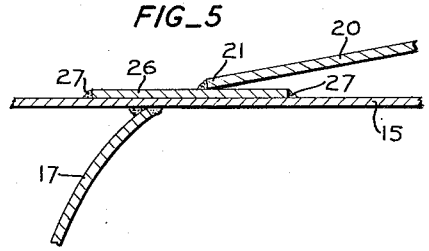
INVENTORS
ROBERT S. HAMPTON
WILLIAM JOSEPHIAN
BY
ATTORNEYS June 5, 1962   R. S. HAMPTON ET AL   3,037,657
CONICAL SUPPORT FOR JACKETED VESSEL
Filed March 3, 1958   3 Sheets-Sheet 3
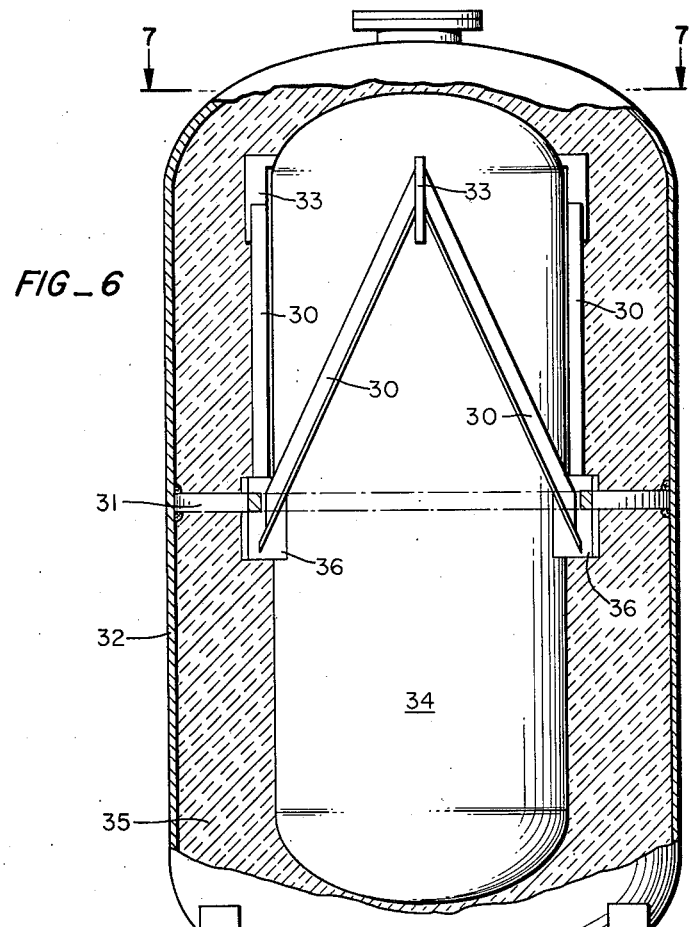
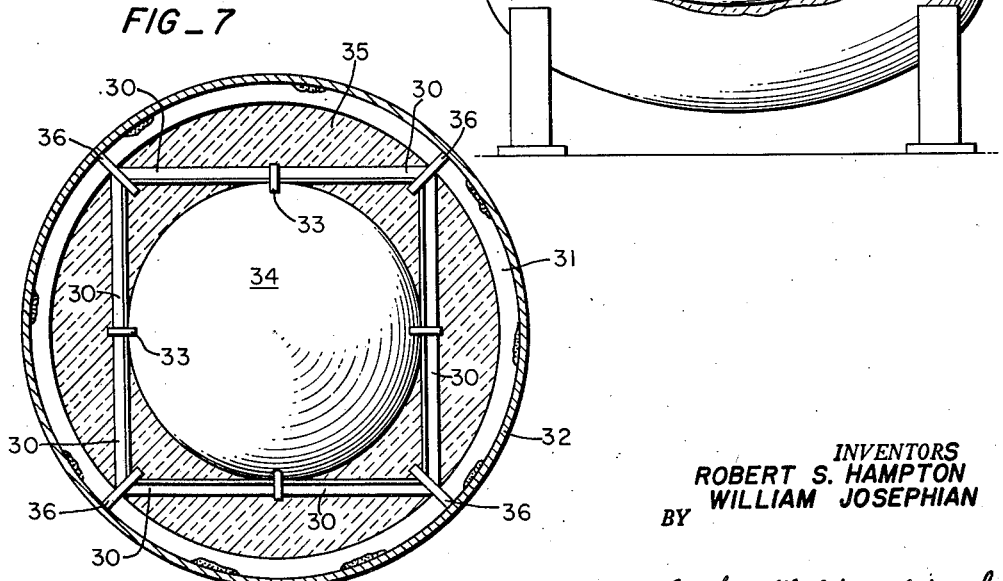
INVENTORS
ROBERT S. HAMPTON
WILLIAM JOSEPHIAN
BY
Boyken, Mahler + Wood

3,037,657
CONICAL SUPPORT FOR JACKETED VESSEL
Robert S. Hampton, 130 El Toyonal, Orinda, Calif., and
William Josephian, 6505 Estates Drive, Oakland, Calif.
Filed Mar. 3, 1958, Ser. No. 718,839
2 Claims. (Cl. 220—15)

This invention relates to a conical support for supporting an inner vessel enclosed within an outer jacket.

Jacketed vessels of various sizes and shapes are used for storing and transporting liquids at low temperature, such as liquid oxygen. In a typical installation an elongated cylindrical vessel containing the liquid oxygen is enclosed within an outer cylindrical jacket providing an annular insulating space between the vessel and the jacket. This insulating space may be vacuated and filled with powdered insulating material so as to provide a suitably insulated container for the low temperature liquid.

Heretofore, various designs have been proposed for members for supporting the fluid-containing vessel within the enclosing jacket. Such supporting members must not only carry the weight load of the filled vessel but must also resist both transverse and axial loads. Particularly with regard to horizontally extending jacketed vessels mounted on truck trailers or railroad cars for transport service, these axial loads, caused by rapid acceleration or deceleration, can be particularly severe.

It is therefore an object of this invention to provide a support for an inner vessel enclosed in an outer jacket, which support is particularly strong in an axial direction.

Another object of this invention is the provision of a support for carrying the vertical, transverse, and axial loads of an inner vessel enclosed within an outer jacket, and which support is extremely rugged and simple to construct.

Still another object of this invention is the provision of a novel, conical support for supporting a horizontally extending cylindrical vessel within an outer enclosing jacket.

It is a further object of this invention to provide a support for an inner vessel enclosed within an insulating jacket in which the heat leak between the vessel and the jacket is minimized.

Other objects and advantages will become apparent from the following description taken in connection with the accompanying drawings, in which:

FIG. 1 is a longitudinal sectional view of a jacketed vessel showing the support structure of this invention;

FIG. 2 is a perspective view of a portion of the inner vessel of FIG. 1 and the support member of this invention;

FIG. 3 is a partial longitudinal sectional view, similar to FIG. 1, but showing a modification of the placement of the support member of this invention;

FIG. 4 is a greatly enlarged sectional view of the connection between the vessel, the jacket, and the support member of FIG. 3;

FIG. 5 is a greatly enlarged sectional view, similar to FIG. 4, of a modified form of connection between the vessel and the support member;

FIG. 6 is a vertical sectional view of a jacketed vessel showing a further modified form of support structure; and, FIG. 7 is a transverse sectional view as seen from line 7—7 of FIG. 6.

In detail, according to FIG. 1, the support member of this invention, generally designated 1, is proposed for use with a jacketed vessel of the type serving to store or transport low temperature liquids such as liquid oxygen.

Such vessels may comprise an inner vessel 2, enclosed within an outer jacket 3. Although the support member of this invention may be used with a variety of different shapes and sizes of vessels it is disclosed herein in connection with the horizontally extending cylindrical vessel 2 having opposed domed or convex heads, 4, 5. Similarly, outer jacket 3 is provided with opposed convex heads 6, 7.

Vessel 2, must, of course, be liquid and gas tight and in conventional practice is provided with various inlet, outlet and vent pipes (not shown). The most effective insulation for a vessel of this type is the annular, continuous insulating space 8 provided between vessel 2 and jacket 3. This space may be evacuated and filled with a powdered insulating material, as shown, to provide adequate insulation against heat leak to the low temperature fluid in vessel 2. In order to retain a vacuum in the insulating space 8 it is necessary that outer jacket 3 be gas tight.

It is therefore necessary that means be provided for supporting the inner vessel 2 in the previously described position with jacket 3. In transport service the outer jacket 3 is typically supported on a truck trailer, railroad car, or other vehicle by means of various conventional supports. The loads imposed on the inner vessel 2, which must be transferred to the outer jacket and its supports, are the vertical weight and live loads, transverse loads, and axial loads. The axial loads imposed by acceleration or deceleration of the vehicle on which the jacketed vessel is mounted may be particularly severe, especially in railroad service.

It will be also understood that where the inner vessel 2 is used for containing liquid oxygen or the like, some provision must be made for expansion and contraction of said vessel due to the temperature changes undergone in cooling to the liquid temperature and warming to ambient temperature or higher, as in steam cleaning or vapor degreasing. This may be accomplished by supporting one end of the vessel 2 in a relatively fixed relationship to jacket 3 and permitting limited movement of the other end of the vessel. In FIG. 1, as will be later described, the conical support 1 of this invention may be used for supporting the fixed end of the tank at head 5, while any suitable means such as rods or straps 9 may support the movable end of the vessel at head 4. It will be understood that there are various conventional means for supporting the movable end of the vessel and that any of said means may be used in connection with this invention, providing only that they permit limited axial movement of head 4 of vessel 2 in response to temperature elongation and contraction.

The support member 1 of this invention comprises a shell or sleeve 10 formed to the shape of the frustrum of a cone. In connection with the type of jacketed vessel herein described, the shell 10 may be of substantially the same thickness as the cylindrical walls of the vessel 2 and jacket 3. For example, the wall thickness of a nine-foot-diameter jacket and a seven-foot-diameter vessel may be approximately $3/16$ inch. In this example, a frusto-conical shell 10 having a wall thickness of approximately $3/16$ inch has been found satisfactory for carrying the required loads.

Shell 10 is provided with opposed open ends, 11, 12, which are respectively substantially equal in diameter to vessel 2 and jacket 3. These ends 11, 12, are respectively secured to said vessel and said jacket, as by welding. In this position the shell 10 extends across the insulating space 8 (FIG. 1) thereby carrying the loads imposed on vessel 2 to the outer jacket 3.

As seen in the example of FIG. 1, the smaller end of shell 10 is welded to the head 5 of the vessel 2 and preferably extends substantially tangentially therefrom across the space 8. The opposite end 12 is welded to outer jacket 3, intermediate the ends thereof, and said shell thereby supports the fixed end of vessel 2 in the central position.

It will be noted that because of its shape the support member 1 is particularly strong in the vertical, transverse and axial directions without the need of cumbersome or complicated structure. As previously explained, shell 10 may be made from a relative thin sheet and is still capable of providing the necessary support, especially against axial loads.

The length of the frusto-conical shell 10 is preferably approximately the same as the diameter of its smallest end 11. In the example previously given the length of the shell would be perhaps 6 feet. The practical limits of the length of said shell are approximately between ½ and 1½ times the diameter of the inner end 11. Obviously a shell substantially longer than this would be subject to a very large moment caused by the weight of the filled vessel. A shell substantially shorter than the minimum length would not provide sufficient support in an axial direction to withstand the acceleration and deceleration loads imposed in transporting service.

A further reason for providing a shell of the length preferred is to provide a longer path of heat conduction so as to minimize the heat leak from the exterior of jacket 3 into vessel 2. Since the shell 10 is relatively thin, no great mass of metal provides a short path across the insulating space 8. To further limit the heat leak through shell 10 the same may be provided with a plurality of perforations 13 (FIG. 2) in certain portions of the shell arranged to provide solid areas or webs 14 between said perforated portions. The heat leak is greatly reduced along the perforated areas because of the tortuous path necessarily followed by conduction. The remaining solid areas 14 are sufficient to carry the major portion of the loads imposed and so perforating the shell does not substantially reduce its strength characteristics. Preferably, the perforated sections are fan shaped so that the aggregate cross-sectional area of metal in the solid areas 14 on any cross-section through the shell will be equal to the cross-sectional area of metal at the small end 11.

Many modifications of the support structure specifically disclosed are within the spirit of this invention. Although it may be most practical to form support member 1 into a continuous frusto-conical shell, the solid areas 14 of the perforated shell of FIG. 2 act in effect like a plurality of converging web members. Such a support member may be fabricated from a pair of rings at opposite ends between which such web members extend. In addition, modifications of the support member of this invention may be desired for a particular size or shape of tank not here disclosed.

One such modification is illustrated in FIGS. 6 and 7. The web members, or elongated support elements 30, may be welded in place diagonally from a plate 36 on the outer tank 32 to a support plate 33 which is welded to the inner tank 34. The support plate 36 is welded to a ring 31 which is welded to the outer tank 32. Said elements 30, preferably made of angle iron, thereby extend slantingly across the insulating space 35 between vessels 32 and 34. In this configuration the entire supporting member is symmetrical and conical, being formed by a series of web members or elements 30 in a "herringbone" design.

The important aspect of the invention, however, is the arrangement of the supporting elements in a symmetrical pattern around the vessel and extending slantingly across the insulating space between the vessel and the jacket.

FIGS. 3, 4 illustrate an inner vessel 15 supported in an outer insulating jacket 16 similar to the jacketed vessel of FIG. 1. The frusto-conical supporting shell 20 of FIG. 3 is similar to shell 10 of FIGS. 1, 2, except for its placement with regard to the inner vessel 15 and its connection thereto. Securing the smaller open end 21 of shell 20 to the cylindrical shell of vessel 15 substantially at its central plane enables supporting the vessel as described with only a single support member. The opposite, larger end 22 of supporting shell 20 is secured, as by welding, to the wall of the jacket 16. Although other means of securement between the supporting member and the vessel and the jacket may be used in both instances here described, continuous welding around the ends of the supporting shell is by far the most practical where similar metals are used.

It is preferable in vessels of certain sizes to reinforce the central portion of the vessel by a baffle 17 comprising a circular plate, flat or dished, and with or without a flanged skirt, welded across the interior of the vessel. Such baffle is preferably provided with a relatively large opening 19 for access through the baffle by a man. The outer jacket 16 may be reinforced by a plurality of ring girders 23 welded thereto, one of which may be placed at the point of securement of the large end 22 of shell 20 to the outer jacket. The large end 22 is preferably welded to girder 23 to spread the load of the connection to jacket 16. In other respects the frusto-conical shell 20 shown in FIG. 3 is similar in structure and purpose to the shell 10 of FIGS. 1, 2.

In the preferred form illustrated in FIGS. 3, 4, baffle 17 is similar in configuration to the convex vessel heads and is provided with a cylindrical flange or skirt 18 which lies alongside and is welded to the inside wall of vessel 15 along both circumferential edges, as at 24 (FIG. 4). In this manner the skirt 18 reinforces the wall of the vessel 15 at the connection of support member 20 thereto and also spreads the axial inertial loads applied by the liquid in the vessel to baffle 17.

It is obvious that with the vessel supported generally at its central plane that the vertical load, of both the vessel and the liquid contained therein, is, in effect, balanced at the point of securement 25 (FIG. 4) of the smaller end 21 of shell 20. The frusto-conical shell 20 may easily be designed to support this load with a minimum of material and still retain sufficient strength for the remaining loads. The transverse, horizontal load is received in member 20 at right angles to the vertical load and is assumed to be no greater than the vertical load and therefore well within the capabilities of shell 20.

In transport service, such as on a railroad car, the greatest loads to which the jacketed vessel will be subjected are axial loads caused by rapid acceleration or deceleration of the liquid filled vessel. By making the jacket 16 and the support member 20 sufficiently strong to withstand a combination of all applied loads, the limiting case will be the stress developed in the shell of vessel 15.

The primary purpose of the baffle 17 is to distribute the axial inertial load of the liquid in vessel 15. It will be noted that without the baffle all this liquid load would be applied against one head of the vessel and therefore would have to be carried by the half of the vessel between said one head and the point of connection to support member 20. In order to avoid so loading the half of the vessel toward which the inertial liquid load is directed, the baffle 17 is secured in place with skirt 18 to divide this load into two approximately equal portions.

The inertial liquid load will then be carried by one vessel head and by the baffle 17 in proportion to their respective projected areas. With the manhole 19 provided in baffle 17, the percentage of the total inertial load carried thereby will be slightly less than the percentage carried by the head (which is solid), but this difference is not so great that their areas cannot be considered generally equal for practical purposes.

It has been found that by securing the skirt 18 to vessel 15 at the two welds 24 and by securing the support member 20 to vessel 15 at weld 25 intermediate said welds 24, the inertial load on the shell of vessel 15 may be reduced. Since this load may be applied in either direction both cases must be taken into account, which results in the placement of weld connection 25 at substantially one-quarter of the distance between welds 24 from one of said welds (FIG. 4). By so placing the connection 25 with relation to the connections 24, only approximately five-eighths of the liquid inertial load is carried by any particular cross section of the shell of vessel 15 in either case of direction of application of the load.

This effect of spreading the inertial load of the liquid may also be accomplished by using a plurality of baffles or by using an outside band 26 (FIG. 5) instead of the skirt 18. In illustration of the latter, it will be noted in FIG. 5 that band 26 is welded to vessel 15 along both circumferential edges 27 while the smaller end 21 of support member 20 is welded circumferentially to said band substantially at the central plane of the vessel. Baffle 17, without the skirt, is welded circumferentially to the inside of vessel 15.

In the example shown in FIGS. 3 and 4 a further reinforcing ring 28 may be added by welding the same to the connection 25 around the outside of vessel 15. It is also preferable, as in the case illustrated in FIGS. 1 and 2 that the support member 20 extend substantially tangentially from the baffle 17.

Since the convex baffle shown is inherently stronger in one direction, it may be provided with stiffeners 30 (FIG. 3) secured to the concave side of said baffle to withstand the liquid inertial load when applied to the right in FIG. 3.

The inner vessel 15 of FIG. 3 is thereby seen to be supported about its central plane so that it is, in effect, balanced at the smaller end of shell 20. Both ends of the vessel 15 are thereby permitted to expand and contract in accordance with temperature changes and other means for supporting the movable ends of the tank are eliminated. Mounting a vessel in this manner within its insulating jacket provides a simple and economical structure which is at the same time sufficiently strong to resist the various loads imposed upon the vessel.

Although the invention has been described and illustrated in detail, further modifications therein that would appear advisable to one skilled in the art are intended to be included in the spirit and scope of the appended claims.

We claim:
1. In combination with a large horizontally extending, cylindrical jacketed vessel for containing very low temperature liquified gas in which a fluid-containing vessel is enclosed in a gas-tight jacket with an annular insulating space provided therebetween, a support member supporting the vertical and transverse loads, and solely supporting axial loads imposed upon said vessel on said jacket comprising: a relatively thin shell formed in the shape of a frustum of a cone providing opposed, circular ends, one of said ends being substantially equal in diameter to said vessel and the other of said ends being substantially equal in diameter to said jacket, means securing said one end to said vessel and means securing said other end to said jacket around substantially the entire circumference of said ends, whereby said vessel is free to expand and contract axially in response to substantial temperature changes, said one end being secured to said vessel at substantially the central plane thereof, a baffle extending across the inside of said vessel, and means securing said baffle to said vessel at said central plane.

2. In combination with a large horizontally extending, cylindrical jacketed vessel for containing very low temperature liquified gas in which a fluid-containing vessel is enclosed in a gas-tight jacket with an annular insulating space provided therebetween, a support member supporting the vertical and transverse loads, and solely supporting axial loads imposed upon said vessel on said jacket comprising: a relatively thin shell formed in the shape of a frustum of a cone providing opposed, circular ends, one of said ends being substantially equal in diameter to said vessel and the other of said ends being substantially equal in diameter to said jacket, means securing said one end to said vessel and means securing said other end to said jacket around substantially the entire circumference of said ends, whereby said vessel is free to expand and contract axially in response to substantial temperature changes, said one end being secured to said vessel at substantially the central plane thereof, a baffle extending across the inside of said vessel, and means securing said baffle to said vessel at said central plane, said last mentioned means including a cylindrical skirt connected to said baffle and secured along at least two spaced circumferential lines to said vessel, and said one end of said shell being secured to said vessel at a location intermediate said lines and substantially one-quarter of the distance between said lines from one of said lines.

References Cited in the file of this patent
UNITED STATES PATENTS

| | | |
|---|---|---|
| 1,607,071 | Gleason | Nov. 16, 1926 |
| 2,198,315 | Nyberg | Apr. 23, 1940 |
| 2,814,410 | Hansen | Nov. 26, 1957 |
| 2,858,136 | Rind | Oct. 28, 1958 |
| 2,863,297 | Johnston | Dec. 9, 1958 |

FOREIGN PATENTS

| | | |
|---|---|---|
| 254,220 | Great Britain | July 1, 1926 |